(12) United States Patent
Chang et al.

(10) Patent No.: US 6,257,107 B1
(45) Date of Patent: Jul. 10, 2001

(54) MANUFACTURE OF COMPOSITE MATERIAL HAND TOOL

(75) Inventors: Rang-Rong Chang; Chingsung Su, both of Taipei (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 08/839,062

(22) Filed: Apr. 23, 1997

(51) Int. Cl.[7] .................................................... B25B 23/14
(52) U.S. Cl. ................................. 81/467; 81/474; 81/900
(58) Field of Search .............................. 81/467, 474, 900

(56) References Cited

U.S. PATENT DOCUMENTS

| | | | |
|---|---|---|---|
| 5,626,061 | * | 5/1997 | Whitley ..................................... 81/63 |
| 5,713,251 | * | 2/1998 | Zurbuchen et al. ..................... 81/61 |
| 5,804,012 | * | 9/1998 | Carmien ................................ 156/172 |

* cited by examiner

Primary Examiner—Daniel J. Jenkins
(74) Attorney, Agent, or Firm—Jacobson, Price, Holman & Stern, PLLC

(57) ABSTRACT

A manufacturing method for a composite material hand tool. Its long and short fiber layers filling is covered with a metal interface ring at one side. The handle can be encircled into a cone shape. A center layer can be a short fiber honeycomb layer. The outer layer is coated with a long fiber. It is a torque wrench made from composite material. Its characteristic includes base composite material, interface ring, internal wall of tooth surface, and exterior of projected rib. Bearing resistance is at the adjacent through hole of the interior wall of tooth surface and the reciprocal commutating tooth surface. The exterior of the projected rib is at the side contacting with the base composite material of the wrench.

4 Claims, 12 Drawing Sheets

(1 of 12 Drawing Sheet(s) Filed in Color)

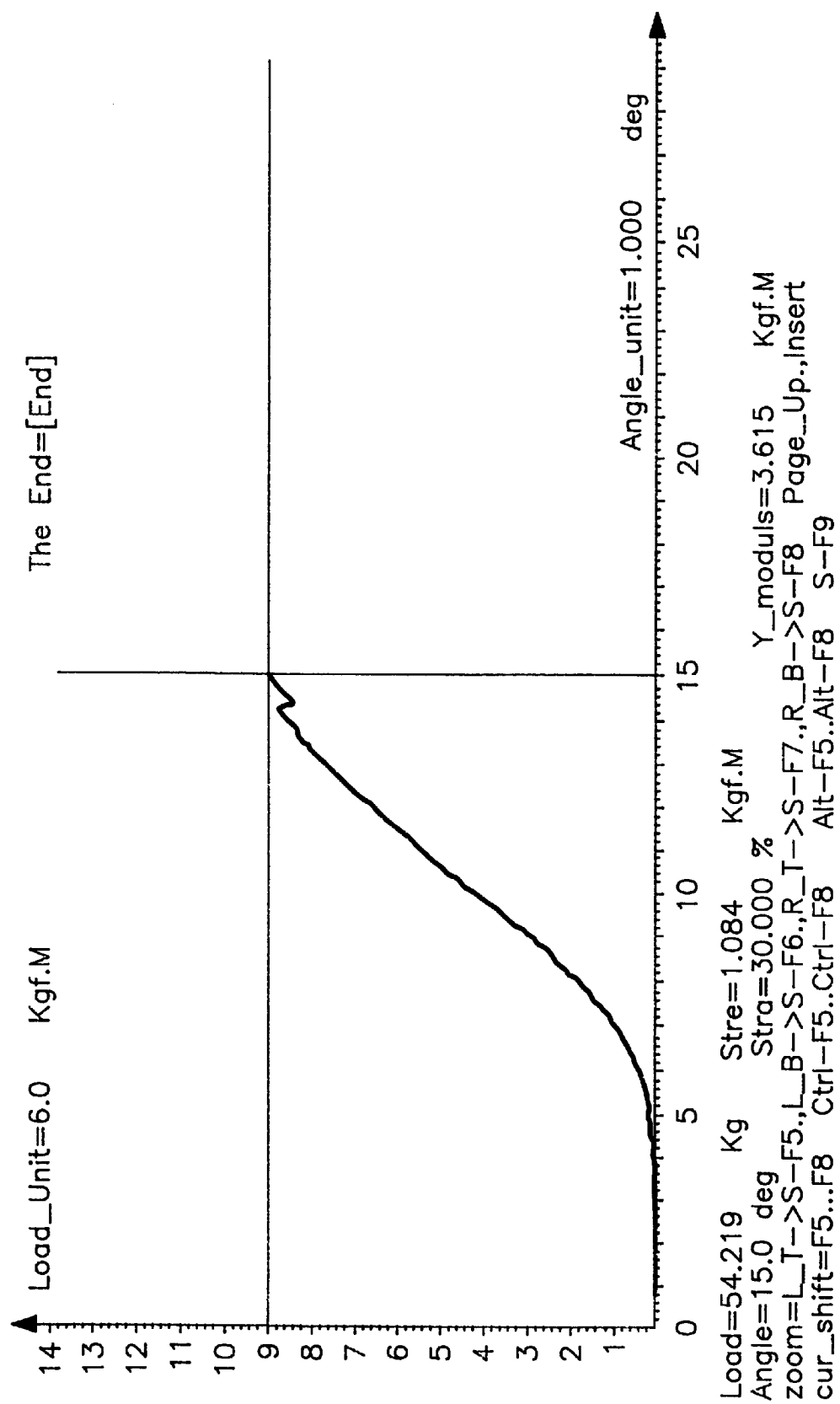

MANUFACTURE OF COMPOSITE MATERIAL HAND TOOL

BACKGROUND OF THE INVENTION

FIELD OF THE INVENTION

This invention concerns the manufacture of a kind of hand tool, in which its structure is made of composite material and the conventional metal specifically.

CROSS-REFERENCE TO RELATED APPLICATIONS

The conventional torque wrench as shown in FIG. 1 and FIG. 2 includes a wrench body (1) which has a long handle (11) for gripping and applying force for manual operation. The other end is a through hole (12) with a serrated internal wall (13). The through hole of the wrench body bears the applied torsion and commutating device, which includes a round torsion head (2) which is put into the above mentioned wrench through hole and rotates freely. The round torsion head has a concave (21) at the side to bear the commutating piece (3). There is a commutating tooth surface at the outside of commutating piece contacting and tabling with the saw teeth of through hole's internal wall. The commutating piece has a through hole (31), so that when the commutating piece is put inside the torsion head the commutating piece's edge pin (4) penetrates through the through hole (22) and (31), hereby, restricting the rotation within the torsion head concave. There is a through hole (23) at the top of torsion head which is used in receiving the commutating turning knob (5) in order to control the applied torsion direction, and there is a square adaptor (24) at the lower end to receive a sleeve (not shown) to lock and loosen the bolt and nut. The turning knob has a lateral through hole (51) to receive the spring (6) and the other end of catch (7) is retained by the spring, enabling the other end of catch to contact with the corresponding commutating piece to generate retention force, and with the left and right rotation of turning knob, the axle of commutating piece's edge pin swings left and right to commutate. The wrench has an O-ring (8) jammed inside the branch ring groove (25) at the lower end of the above mentioned torsion head fixing the whole torsion and commutating mechanism inside the wrench body.

Since the study of composite material had been going on for along period of time and its characteristic and mechanical property are found in general textbooks and thesis, detailed discussion is not included in this invention as it can be easily obtained by craftsmen accustomed to this item. Therefore, explanation shall be made only on the unique feature concerning the background of this invention.

Composite material is generally divided into long fiber and short fiber materials. It is formed by the combination of fiber and matrix. The commonly seen composite materials according to the different proportion of fiber and matrix are E-GLASS composite material, graphite, and boron. Its strength is 1.3–5.8 GN/mm$^2$ and density is 1.5–2.63 g/cm$^2$. Hence, its specific strength can be obtained through simple comparison method by dividing its strength to density. Specific strength of conventional steel material is 0.058–0.106, while the specific strength of composite material is 0.19 to 0.46 which is far better than the conventional steel material.

Composite material also has another advantage of controlled anisotropy, directing the mechanical property of each anisotropic mechanical property to be arranged through fiber direction and easily improved, hereby, attaining optimized design. Although composite material is light and has high strength, however, its material is brittle, not suitable in bearing direct force with metal working surface because it easily abrade or crack.

The R.O.C. patent application Ser. No. 80205895 [for strengthened Ratchet Wheel Socket Wrench of composite Material] applied is constituted by a handle, a cover piece, and a ratchet wheel. It is further revealed that its characteristic is by jointing the said handle and cover piece to accommodate the said ratchet wheel. The composite material is used in wrapping the outside edge of the wrench handle and extend to the head.

In the above mentioned patent application, handle and cover piece are jointed to accommodate the ratchet wheel component and bear the torsion to prevent possible wear between the composite material and movable parts (that is, ratchet wheel component). In this case, wrench handle extending to its head is wrapped with composite material.

It is very clear that the unique characteristic of composite material which is light, high strength, and controllable anisotropy was not fully utilized in this case. First, the handle was wrapped with composite material which only reduce the operation load limitedly and the light quality of composite material was not efficiently utilized. Next is that the controlled anisotropy of composite material was not efficiently arranged, resulting in wasting more material or was not able to attain the strength required by the user.

In the R.O.C. patent application Ser. No. 78203641 [for Plate Ratchet Wrench], ratchet head is by non-metal injection molding. In the patent application Ser. No. 77212298 [for New Structure of Ratchet Socket Wrench], upper clamp and lower clamp of ratchet mechanism are made of fiber glass by continuous forming. This patent category reveals only the characteristic of ratchet component.

Ordinarily, manufacture of composite material hand tool is by hot pressing the composite material such as the inorganic fiber composite material revealed in U.S. Pat. No. 4,572,271, and silicon carbide or boron carbide as composite material revealed in U.S. Pat. No. 4,753,850. In R.O.C. patent application Ser. No. 82106839 [ for Metal Golf Club Surface Rubber Adhesion by Hot Compression Forming and Its Head] reveals the manufacturing process of synthetic rubber by hot compression forming.

SUMMARY OF THE INVENTION

Since conventional wrench is generally alloy steel forged, its size or long hour of use causes fatigue and inconvenience to the user. But the excellent strength, weight ratio, and the controllable anisotropy of composite material exactly conforms with all the condition of solving the problem of conventional hand tool.

In this invention, composite material is used in manufacturing the body of hand tool which greatly reduces the weight of hand tool. It also uses an interface ring, in which its interior wall is designed with a contact tooth surface engaging with commutating mechanism when wrench torsion is applied. Outer wall of ring has a groove inserted in the composite material of wrench body to reduce its weight.

With regards to torsion application and commutating mechanism (ratchet component) in this invention, it is the application of a conventional technique such as the structure used in the American STANLEY tool brand. Therefore, it shall not be discussed in this invention.

BRIEF DESCRIPTION OF THE DRAWINGS

The file of this patent contains at least one drawing executed in color. Copies of this patent with color drawings FIGS. 10(a)–10(b) are diagram shown strength test of composite material hand tools in the invention

Figure 1:
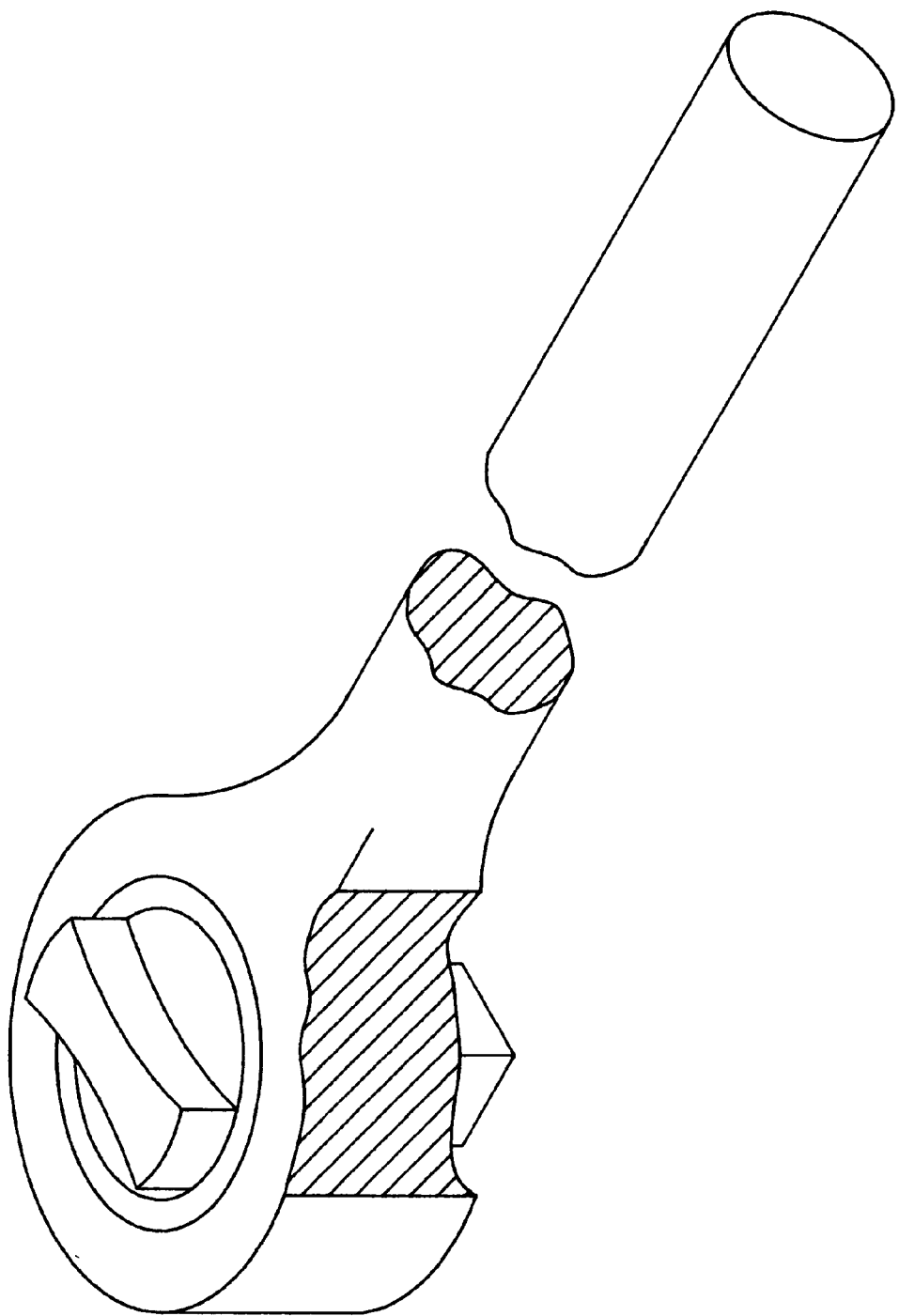
FIG. 1 is a perspective assembly drawing of conventional torque wrench

REFERENCE NUMBER OF THE ATTACHED DRAWINGS 1. wrench body
2. torsion head
3. commutating piece
4. commutating edge pin
5. turning knob
6. spring
7. catch
8. ring
11. long handle
12. hole
13. serrated internal wall
21. concave
22. hole
23. hole
24. square adaptor
25. branch ring groove
31. hole
32. commutating tooth surface
51. hole
91. computer
92. clamp
93. sensor
94. track
95. fix base
110. ring
111. inner wall
112. projecting rib outer wall
121. tooth surface inner wall
122. outer wall approximately forms
123. lateral rib strip
130. interface ring
131. tooth surface inner wall
132. projecting rib outer wall
133. crater
140. interface ring
141. tooth surface inner wall
142. outer wall
143. rib crater
144. lateral rib strip

DETAILED DESCRIPTION OF THE INVENTION

It is the manufacture of composite material hand tool. The composite material is hot pressed and manufactured into hand tool body to reduce most of its weight. Also, an interface ring which includes the internal wall of tooth surface contacts directly with the tooth surface of metal commutating component to bear the torsion and overcome the problem of wear. The exterior of interface ring also tabling with the wrench body mentioned above, so that the light and high strength quality of the composite material is fully utilized, which is its feature. It also solves the problem of the jointing of composite material with metal, hence, its service life is long and reduces working load fatigue. The composite material of the body is constituted by long fibers and short fibers, tabling the formability of bulk molding compound ("B.M.C.") with the above mentioned metal interface ring, at the same time using the line-up direction of long fiber to further attain the optimized light, strong, and tough quality of the structure.

Major Characteristic Of The Invention

The spirit of this invention is to fully utilize the excellent characteristic of composite material and efficiently use its light quality, high strength, and controllable anisotropy to achieve optimized design. First is by bonding the plasticity of short composite fiber with metal interface ring or other dent surface or rough surface, and wrap with long fiber, using the anisotropy of long fiber arrangement to strengthen the construction in order to bear the bending moment, thus, obtaining an optimized hand tool structure.

The main purpose of this invention is to provide a manufacturing method of composite material hand tool in order to reduce its weight and increase its strength.

The second purpose of this invention is to provide a kind of interface ring so that the conventional metal binds tightly with composite material.

Figure 2:
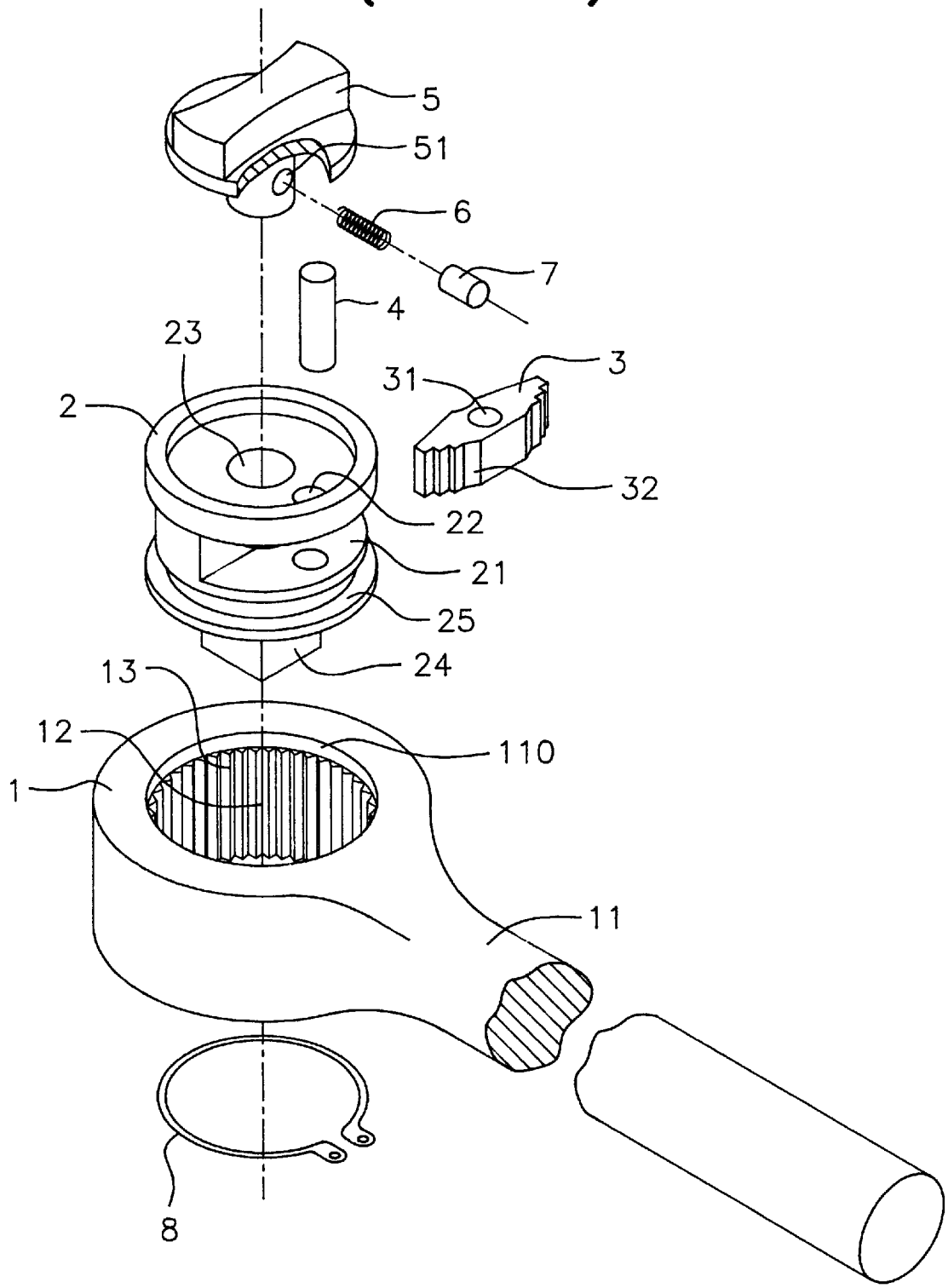
FIG. 2 is a perspective disassemble drawing of conventional torque wrench

Exemplary explanation in this invention is the torque wrench. With regards to other purposes, please refer to the following explanations and attached drawings for a better understanding:

One of the feature of this invention is in providing a kind of interface ring, please refer to FIG. 2 and FIG. 3. The interface ring used in torque wrench includes wrench body (1), torsion head (2), commutating piece (3), commutating edge pin (4), commutating knob (5), spring (6), catch (7), and fixing 30 ring (8). It mainly uses the composite material of short and long fiber in manufacturing wrench body by hot compression forming, and insert an interface ring (110) into the wrench through hole (12) by continuous hot compression forming.

Figure 3A:
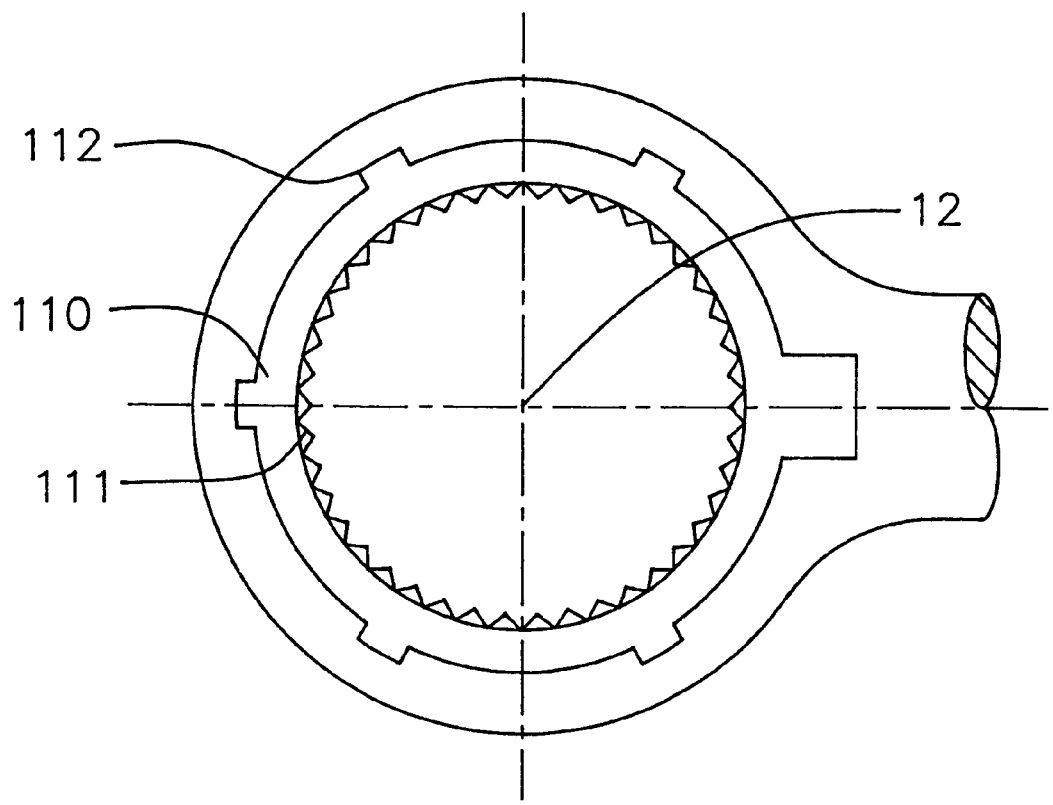
FIGS. 3a and 3b are detailed explanatory plan and sectional drawings of the interface ring in the invention
Figure 3B:
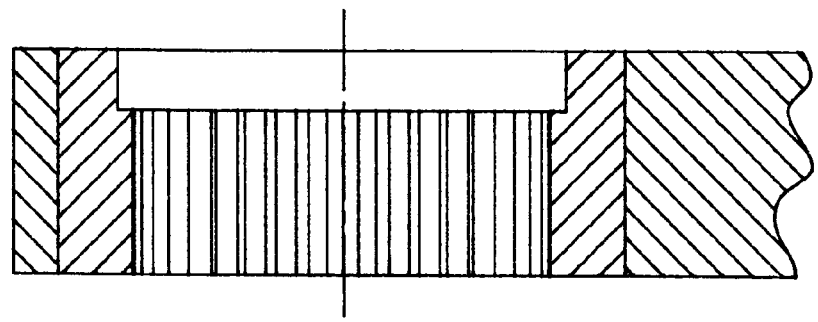

The configuration of the said interface ring is as shown in FIGS. 3a and 3b, which includes tooth surface inner wall (111), projecting rib outer wall (12). Adjacent through hole (112) of tooth surface inner wall (111) and the reciprocating commutating tooth surface receive the bearing resistant. The projecting rib outer wall (112) at the side let-in with the relative composite material of wrench body. The said interface ring can be forged by conventional metal which can bear metal contact wear and improve the brittle fracture of composite material. Also, with the close binding of the outer wall and composite material by continuous hot compression forming, it substitutes the light composite material of the wrench body. The weight of hand tool is greatly reduced, making long-hour operation easy and reduces the burden and fatigue.

Figure 4A:
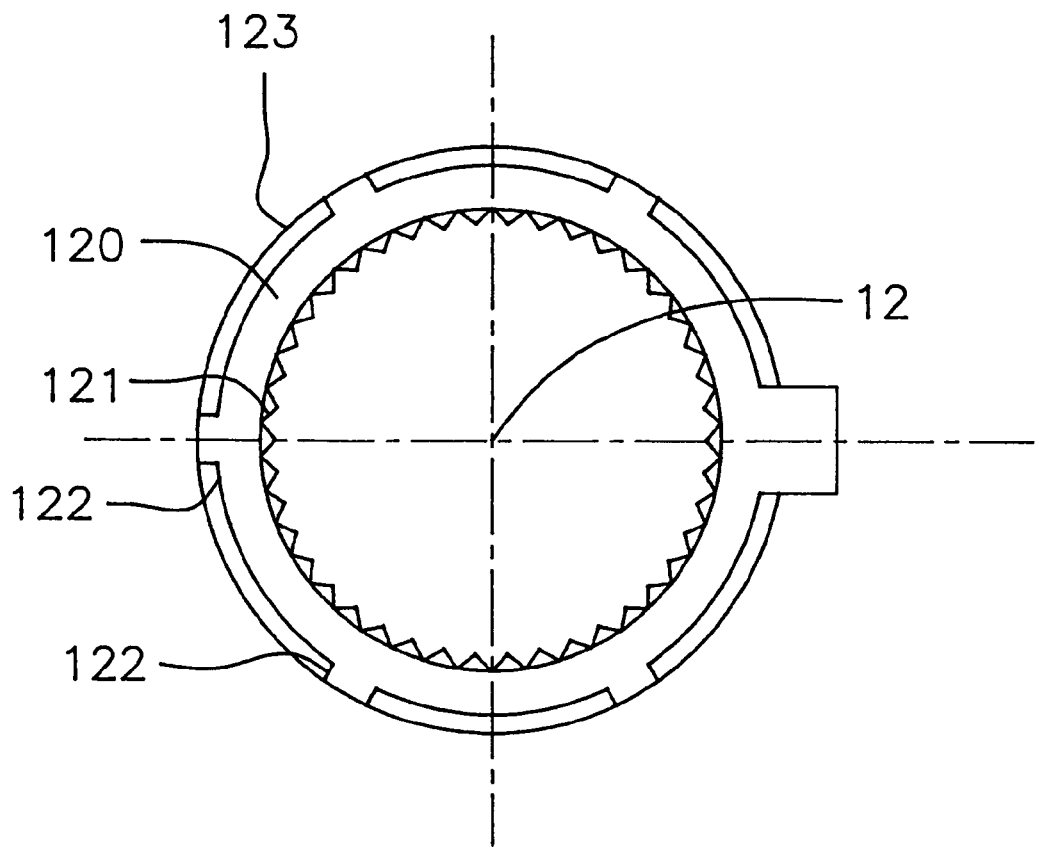
FIGS. 4a and 4b are another implemented plan and sectional drawings of an example of the interface ring in the invention
Figure 4B:
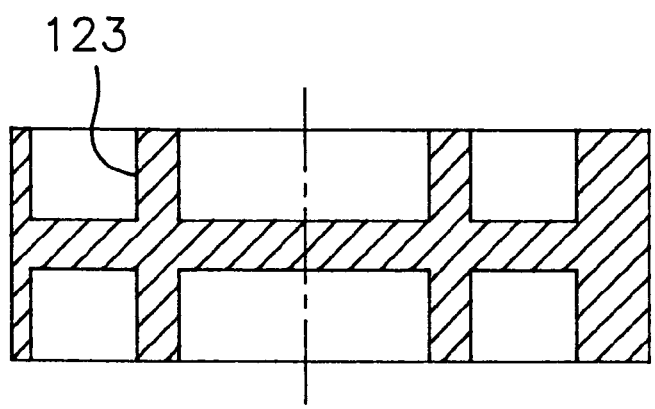

Please refer to FIGS. 4a and 4b for another implemented example of interface ring in this invention. It is an interface ring (120) inserted in the wrench body (1), which includes a tooth surface inner wall (121) and reciprocating commutating tooth surface (32) bearing the torsion, and the projecting rib tabling with wrench body, then a lateral rib strip (123) on the outer wall approximately forms (122) a right angle with the above mentioned projecting rib. This way, it can further control the vertical distributed force of the applied force and the possible failure of vertical distributed force.

Figure 5A:
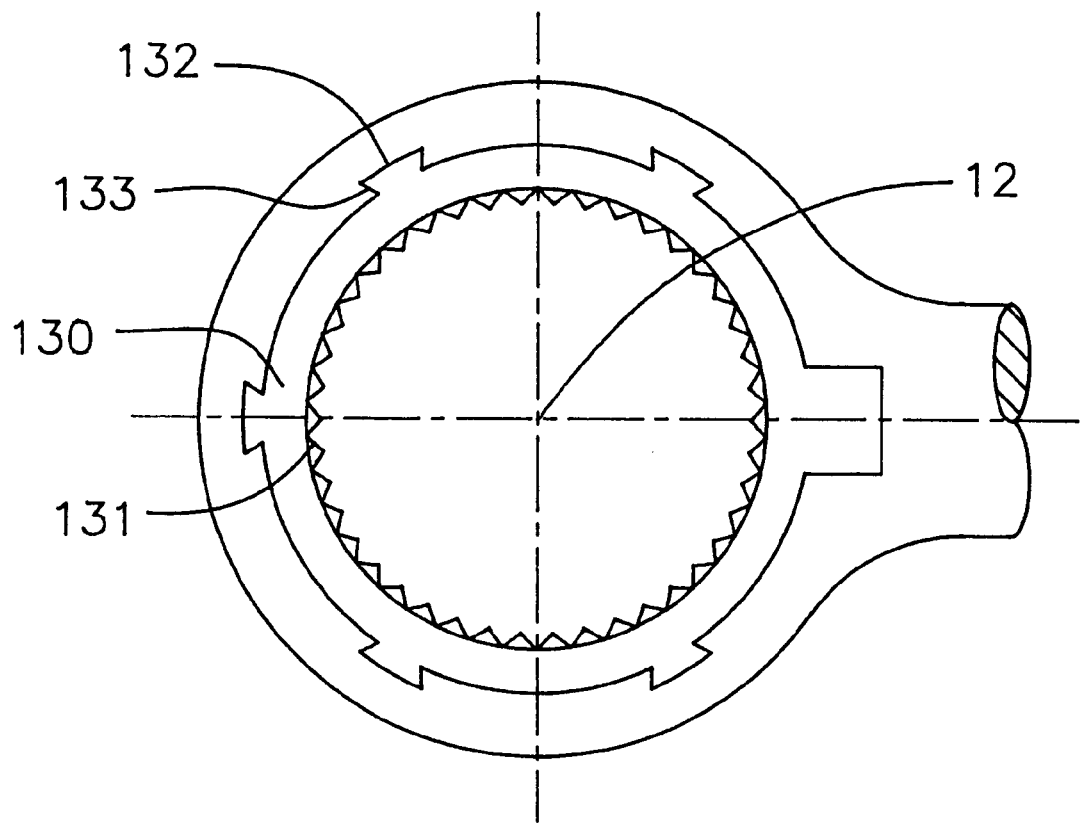
FIGS. 5a and 5b are another implemented plan and sectional drawings of an example of the interface ring in the invention
Figure 5B:
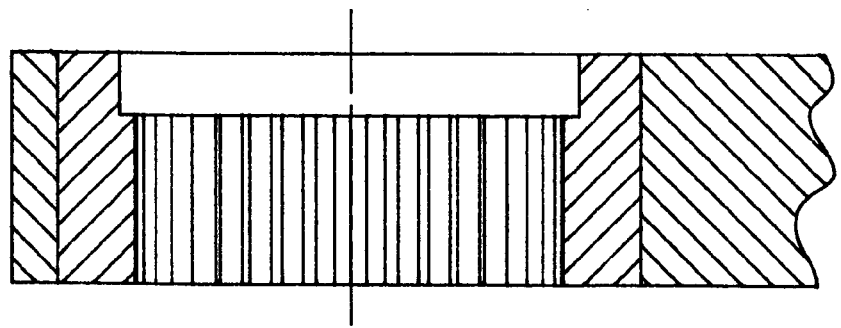

FIGS. 5a and 5b are another implemented example of this invention. The interface ring (130) tabling with wrench body includes a tooth surface inner wall (131) and projecting rib outer wall (132). In which the above mentioned projecting rib outer wall includes a crater (133) to increase the contact surface of composite material with metal and further increase its binding power.

Figure 6A:
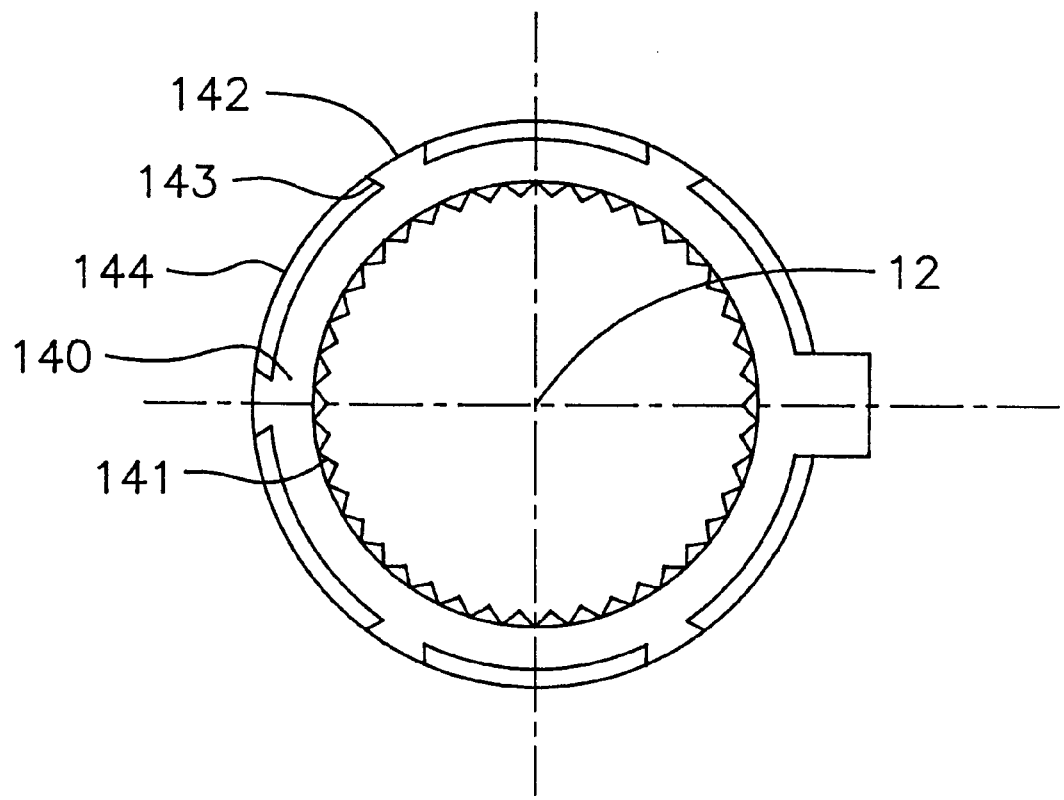
FIGS. 6a and 6b are another implemented plan and side drawings of an example of the interface ring in the invention
Figure 6B:
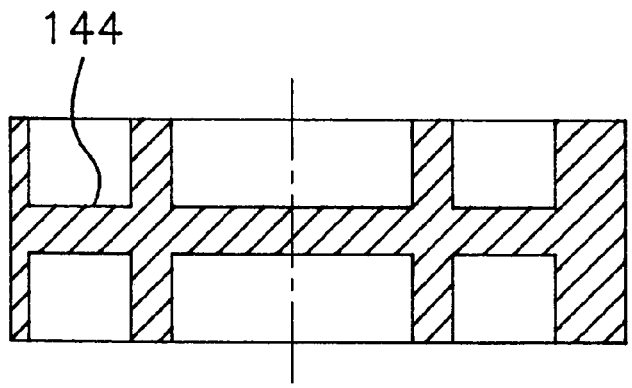

FIGS. 6a and 6b are other implemented examples example of this invention. The interface ring (140) includes a tooth surface inner wall (141), projecting rib outer wall (142), and projecting rib crater (143) which includes a lateral rib strip (144) on the above mentioned projecting rib approximately forming a right angle to control the vertical distributed force of the applied force and the failure of vertical distributed force.

This invention is a hand tool which structure is made of composite material by hot compression forming to reduce most of its weight, at the same time using the excellent strength of composite material to reduce working load.

An interface ring is used in this invention which inner wall contacts directly with the metal and able to bear long period wear and possible fracture. Also using the outer wall projecting rib of interface ring to join with composite material by hot compression.

Figure 7:
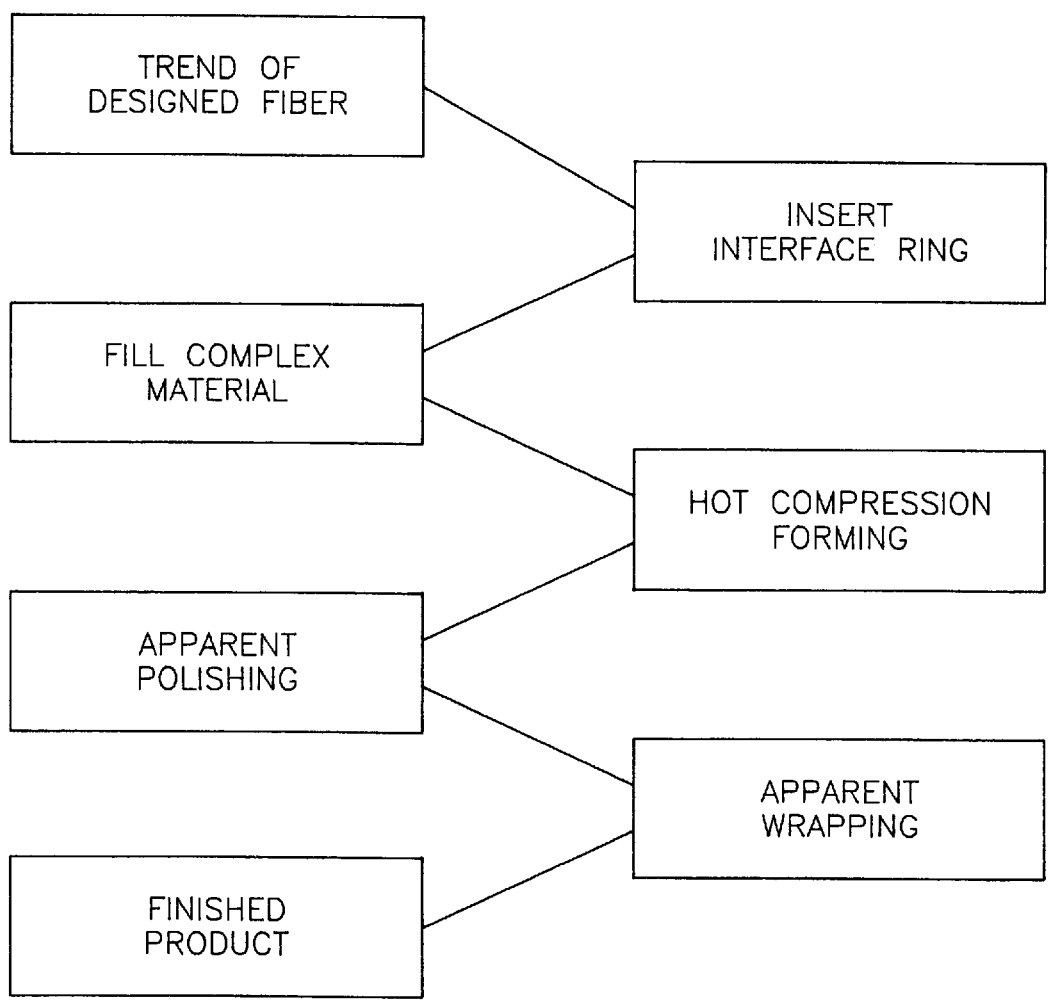
FIG. 7 is a flow diagram shown manufacturing procedures of the invention
Figure 8:
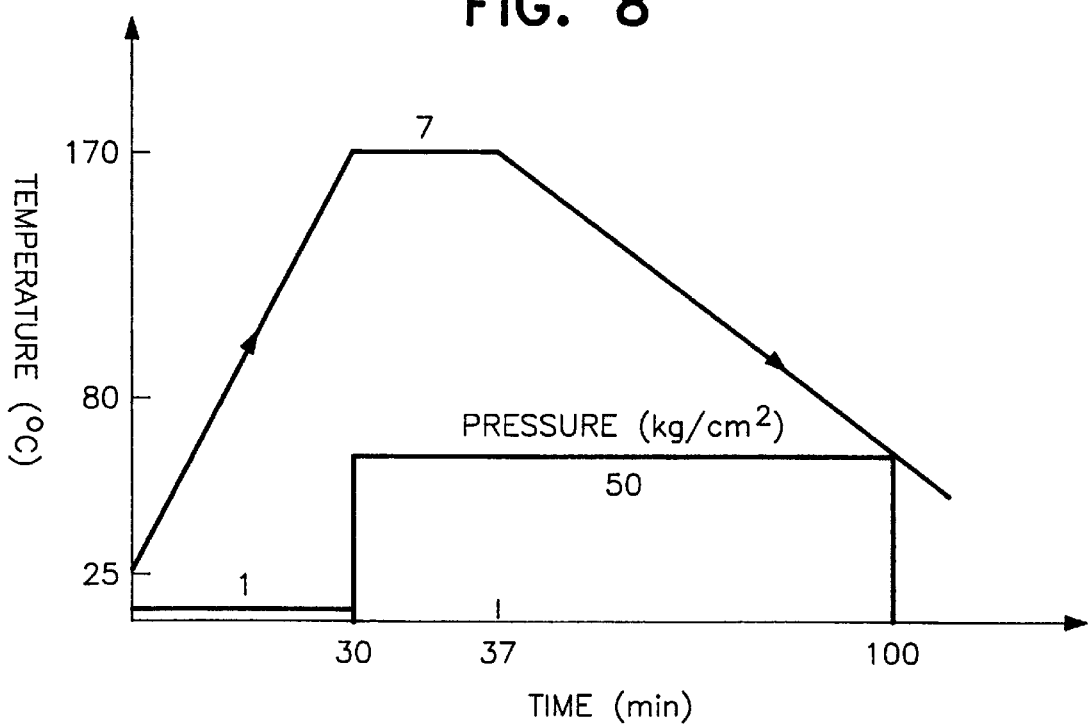
FIG. 8 is a diagram showing hot compression manufacturing drawing of the invention

Another feature of this invention is the production procedure. Please refer to FIG. 7 Manufacturing Procedures and Flow Diagram. First, prepare hand tool mold. Ordinarily, it is divided into upper mold and lower mold. Composite geometric molding is divided into upper, middle, and lower molds or other method. Mold material used is medium carbon die steel or material similar to steel. In general, this is easy for craftsmen who are accustomed to it. Domain of mold not included in the spirit of this invention is not described. Next, put the above mentioned metal interface ring in the mold. Fill the outside of interface ring with long and short fibers and wrap completely. The mold is now filled with composite material. Due to the good forming characteristic of short fiber, it is thoroughly inserted in the upper outer side, top and bottom of interface ring, achieving actual binding without disengaging. An improvement was made on the design of long fiber to bring out the controllable anisotropy of composite material. According to the outcome of the long academic study of the inventor, by using the principle of optimized design, its long fiber lamination is symmetric or asymmetric line-up and the length breadth ratio of grip is approximately 10. Optimum line-up angle of its fiber is [±5°] ns, able to bear maximum torsion moment or bending moment. Next is to put the composite material mold under a hot compressor. Hot compression time and temperature and coordinating formula is as shown in FIG. 8. With regards to the graphite fiber used in all the implemented examples of this invention, the mold should be preheated to approximately 170° C., then put the mold in approximately 50 Kg/cm$^2$ pressure for approximately 7 minutes so that the graphite fiber and epoxy resin are thoroughly cured. Long and short fiber lamination is filled all around the side of metal interface ring. In which the grip can be encircled into a cone shape and its middle layer is short fiber or honeycomb layer aluminum plate while its outer layer is wrapped with long fiber composite. After cured forming, the hand tool is taken out from the mold. Polish if necessary to remove burr. Naturally, surface polishing may be omitted. If it was necessary to engrave designs inside the mold, increase the grip control of hand tool. Aside from this, in order to improve the comfort of gripping the hand tool, wrap a soft material at the grip, such as rubber material.

Manufacture of composite material hand tool includes the following steps:
(a) Put the metal interface ring in the said mold, enabling a side of metal interface ring to join with metal ratchet, while another side is coated with bridging agent and tabling with composite material B.M.C. and long fiber.
(b) Arrange angle of optimized crossing of long fiber to [±θ] ns. Fill it around the side of metal interface ring and along the inner wall of mold to form a circle. Fill B.M.C. between metal interface ring and long fiber composite. θ is the direction of fiber.
(c) Put the mold under the cured temperature, pressure, and time of composite material to form (as indicated in FIG. 8).
(d) After forming, polish hand tool surface and wrap the grip with soft material to increase its workability and wear-resistance.

Experimental Result

The mechanical properties of composite materials and conventional steel material are known in most of the material manuals. The binding of composite material and steel is especially applied in this invention. The effect of its strength and binding power has to be further proven.

The same size as the SNAP-ON brand tool (U.S.A.) was used in this invention. The same function test data was used as comparison basis. Size of sample adaptor was ½", length was 11⅝", and weight of composite material was 80 g. Torsion tester made by Chun Yen Precision Company was used in measuring the torsion moment. Accuracy of the testing results is within 1%.

Figure 9:
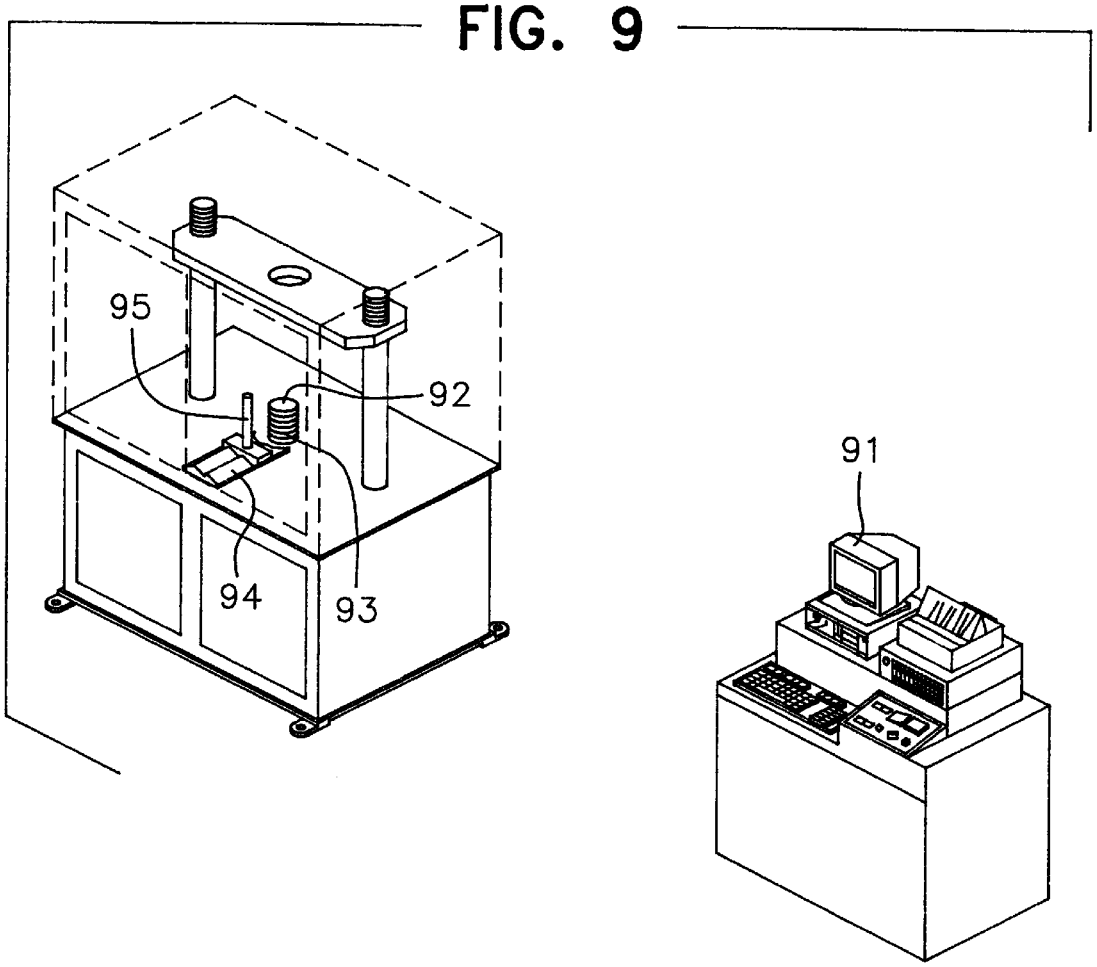
FIG. 9 is a structural drawing of torsion tester in testing of the invention

FIG. 9 is the configuration drawing of torsion tester. The test sample was put in the clamp (92). Clamp (92) has a sensor (93) converting torsion moment directly to voltage signal, linked to the computer (91), read the value of torsion moment and displayed on the monitor. Slide track (94) and fix base (95) were used in fixing the test sample. The technique of reading, magnifying, and processing of torsion signal in this experiment were not directly related to this invention.

Figure 10A:
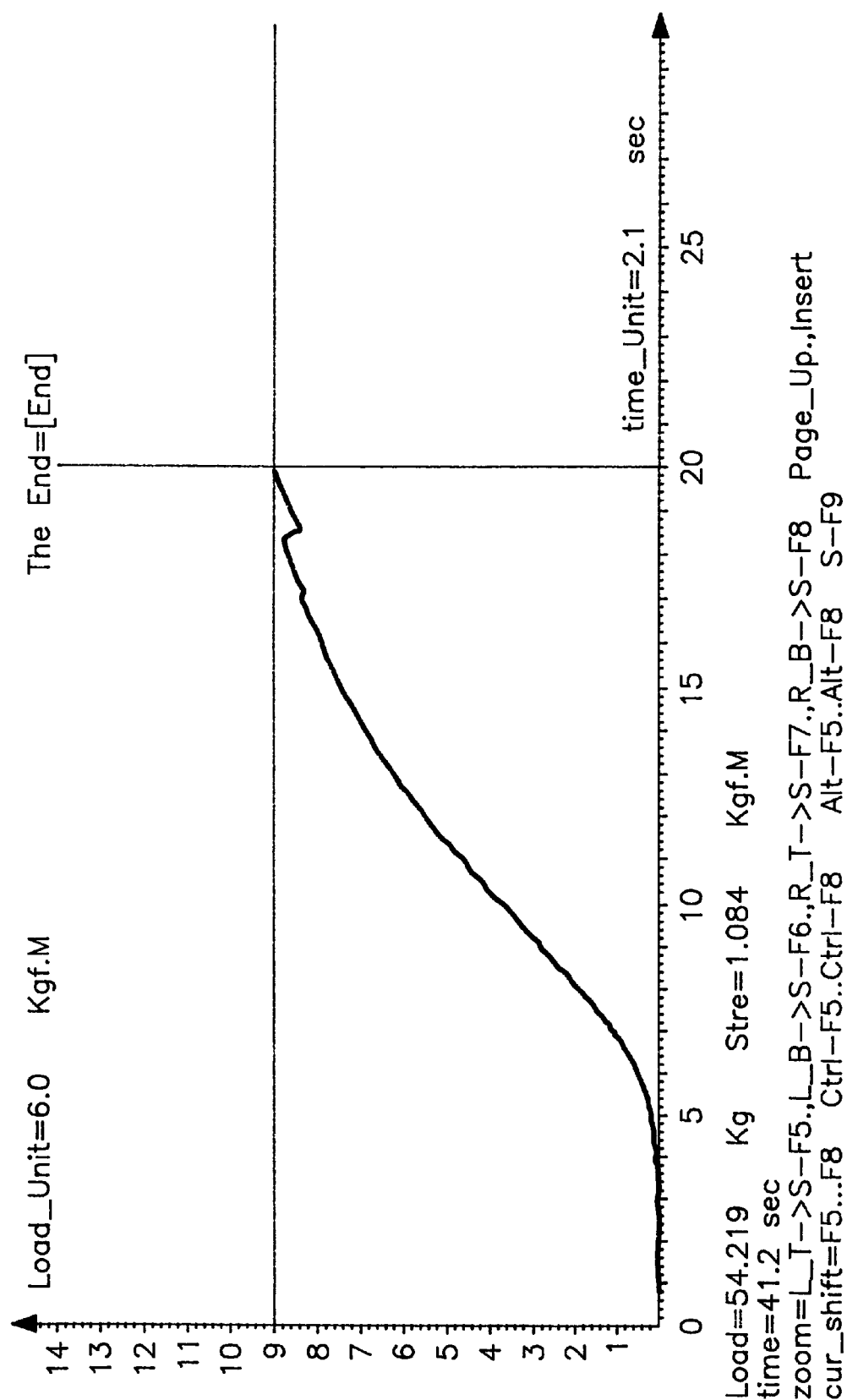
Figure 11:
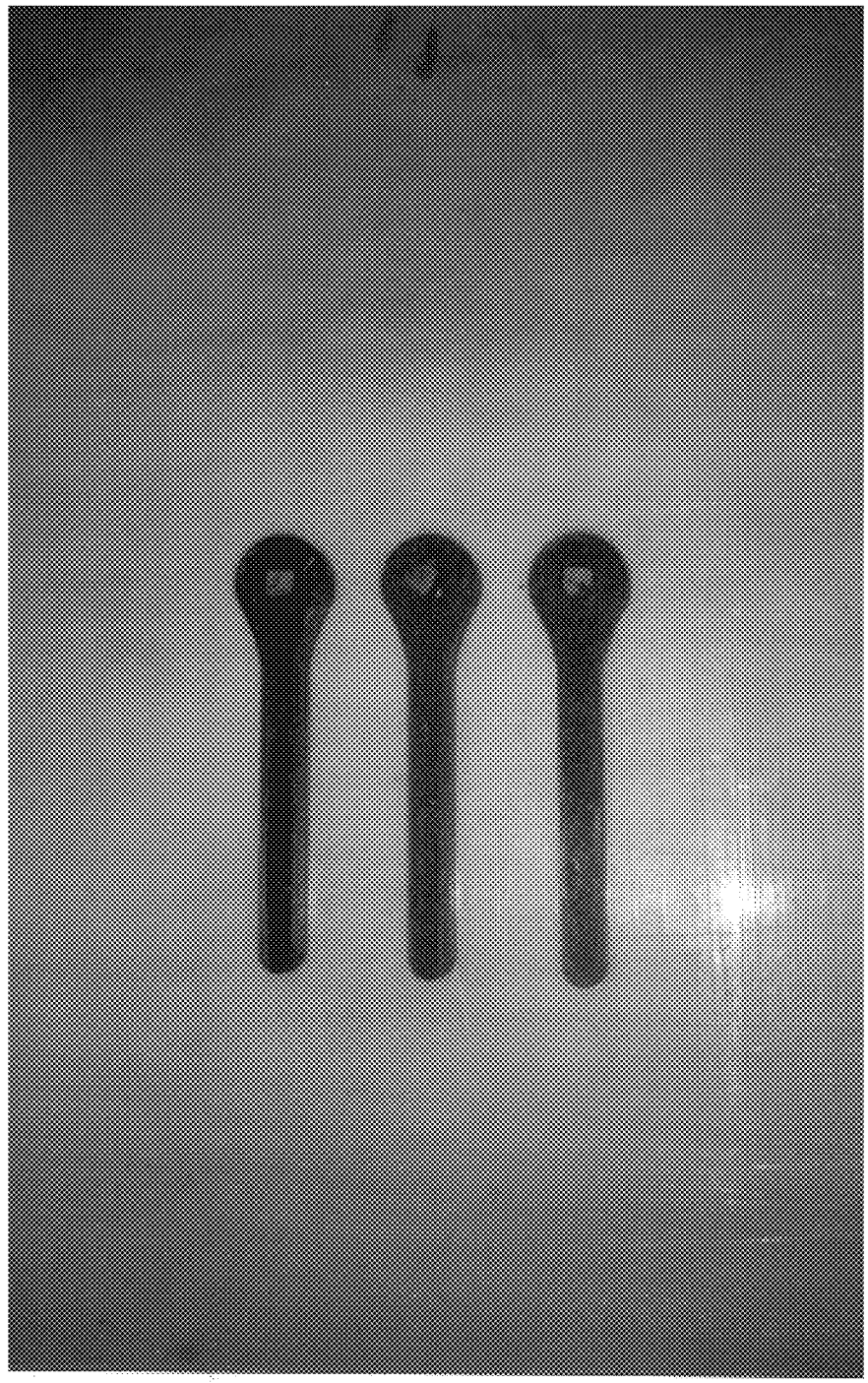
FIG. 11 is a diagram shown practical wrench and crack diagram of composite material hand tool in the invention

FIGS. 10(a)–10(b) are the failure strength output diagrams of this composite material hand tool tested by the torsion tester. The abscissa represents time or torsion angle and the ordinate represents the strength of torsion moment. It is very clear from the drawing that when time/torsion angle increases, its relative torsion moment load also increases. Its tendency is a typical performance of ductile metal. It is known from the drawing that the strength of torsion failure is 54.219 Kg-M and relative torsion failure angle is 14.9 degrees. From the actual torsion failure in FIG. 11, it is known that the metal adaptor snapped first while the joint of composite material and metal remained intact. Therefore, we can expect that the binding failure strength of composite material and metal or the strength of the composite material of handle itself far exceeded the metal failure strength (54.219 Kg-M) currently measured. Also, the maximum failure strength of the above mentioned ½" SNAP-ON hand tool adaptor is 39.43 Kg-M.

Based on the description of the implemented example of torque wrench in this invention, in the manufacture of hand tool, short fiber fully bind with the metal interface to prevent frictional wear due to loosening between the composite material and metal. Also using the optimized design of long fiber angle to attain a structural lightness and high strength, fully manifesting the advantage of composite material. This process is also applicable in manufacturing other similar hand tools, which is within the scope and spirit of this invention. For example, the profile of interface ring and the dent and rough surface of composite material, type of composite material and mixing proportion, and the modification of size and profile are all within the scope of this Claim.

Summing up the above, whether it concerns the purpose of composite material hand tool, measures, and function, they all shows the characteristic of this technique and the practicality, originality, and advancement of this invention conforms with the requirement of invention patent.

What is claimed is:

1. A torque wrench made of a composite material, said torque wrench comprising:
   an interface ring having a tooth surface inner wall defining a surface of a through hole and a, projecting rib outer wall, the projecting rib outer wall contacting a composite material of a wrench body.

2. A torque wrench made of a composite material, said torque wrench comprising: an interface ring inserted in a wrench body, a tooth surface inner wall, a reciprocating commutating tooth surface, and a projecting rib of said interfacing ring contacting said wrench body, a lateral rib strip on an outer wall forming a right angle with the projecting rib.

3. A torque wrench made of a composite material, said torque wrench comprising: an interface ring inserted in a wrench body and including a tooth surface inner wall and a projecting rib outer wall, the projecting rib outer wall including a crater to increase a contact surface of a composite material of the wrench body with metal of the interface ring.

4. A torque wrench made of a composite material, said torque wrench comprising: an interface ring located in a wrench body of composite material, said interface ring including a tooth surface inner wall, a projecting rib outer wall, and a projecting rib crater including a lateral rib strip on the projecting rib forming a right angle with the projecting rib outer wall to control a vertical distributed force of applied force and a possible failure of vertical distributed force.

* * * * *